(12) United States Patent
Jiang et al.

(10) Patent No.: US 12,507,095 B2
(45) Date of Patent: Dec. 23, 2025

(54) RANDOM ACCESS METHOD, TERMINAL DEVICE, AND NETWORK DEVICE

(71) Applicant: VIVO MOBILE COMMUNICATION CO., LTD., Dongguan (CN)

(72) Inventors: Dajie Jiang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 357 days.

(21) Appl. No.: 18/138,190

(22) Filed: Apr. 24, 2023

(65) Prior Publication Data

US 2023/0389083 A1 Nov. 30, 2023

Related U.S. Application Data

(63) Continuation of application No. PCT/CN2021/124561, filed on Oct. 19, 2021.

(30) Foreign Application Priority Data

Oct. 23, 2020 (CN) .......................... 202011152079.1

(51) Int. Cl.
*H04W 24/08* (2009.01)
*H04W 74/0833* (2024.01)

(52) U.S. Cl.
CPC ....... *H04W 24/08* (2013.01); *H04W 74/0833* (2013.01)

(58) Field of Classification Search
CPC .... H04L 5/0091; H04L 5/0048; H04W 76/20; H04W 36/08; H04W 80/02; H04W 74/08; H04W 24/08; H04B 7/0626; H04B 7/145
See application file for complete search history.

(56) References Cited

U.S. PATENT DOCUMENTS

2019/0174516 A1* 6/2019 Shimezawa ....... H04W 72/1263
2020/0146068 A1   5/2020 Islam et al.
(Continued)

FOREIGN PATENT DOCUMENTS

CN   109041593 A   12/2018
CN   111148268 A    5/2020
(Continued)

OTHER PUBLICATIONS

International Search Report issued in corresponding International Application No. PCT/CN2021/124561, mailed Dec. 27, 2021, 4 pages.
(Continued)

*Primary Examiner* — Iqbal Zaidi
(74) *Attorney, Agent, or Firm* — IPX PLLC

(57) ABSTRACT

A random access method, a terminal device, and a network device are provided. The method includes: transmitting first information used for random access, where a preamble carried in the first information is determined based on information of a plurality of target signals; receiving second information transmitted by a network device, where the second information is a random access response to the first information; transmitting third information based on the second information; and receiving fourth information transmitted by the network device, where the fourth information is response information to the third information.

19 Claims, 12 Drawing Sheets

(56) References Cited

U.S. PATENT DOCUMENTS

2022/0150800 A1* 5/2022 Harada ................ H04L 5/0091
2023/0389083 A1* 11/2023 Jiang ................ H04W 74/0833

FOREIGN PATENT DOCUMENTS

| CN | 111357380 A | 6/2020 |
|----|-------------|--------|
| CN | 111726825 A | 9/2020 |
| WO | 2020085996 A1 | 4/2020 |

OTHER PUBLICATIONS

Vivo, "Remaining issues on RACH procedure", 3GPP TSG RAN WG1 Meeting #93, R1-1806035, May 2018, 10 pages.
Extended European Search Report issued in related European Application No. 21881981.1, mailed Jan. 29, 2024, 11 pages.
VIVO: "Discussion on enhancements to initial access procedure", 3GPP Draft; R1-1904066, Apr. 2019, 10 pages.

* cited by examiner

600

S601

Determine a transmit power for first information for random access based on path loss values of a plurality of target signals

S602

Transmit the first information used for random access, where a preamble Preamble carried in the first information is determined based on information of the plurality of target signals

S604

Receive second information transmitted by a network device

S606

Transmit third information based on the second information

S608

Receive fourth information transmitted by the network device

Receive first information for random access, where a preamble Preamble carried in the first information is determined based on information of a plurality of target signals

S804

Transmit second information, where the second information is a random access response for the first information

S806

Receive third information transmitted by a terminal device, where the third information is a response to one piece of target second information in the second information

S808

Transmit fourth information to the terminal device, where the fourth information is response information for the third information

FIG. 8

RANDOM ACCESS METHOD, TERMINAL DEVICE, AND NETWORK DEVICE

CROSS-REFERENCE TO RELATED APPLICATIONS

This application is a continuation of International Application No. PCT/CN2021/124561, filed Oct. 19, 2021, which claims priority to Chinese Patent Application No. 202011152079.1, filed Oct. 23, 2020. The entire contents of each of the above-referenced applications are expressly incorporated herein by reference.

TECHNICAL FIELD

Embodiments of the present disclosure relate to the communications field, and in particular, to a random access method, a terminal device, and a network device.

BACKGROUND

In a Random Access Channel (RACH) procedure, for example, in a four-step RACH procedure, a terminal needs to determine a Physical Random Access Channel (PRACH) occasion based on an index of a measured SSB whose serving cell Synchronization Signal (SS) Reference Signal Received Power (RSRP) is greater than a Synchronization Signal and PBCH block (SSB) RSRP threshold (for example, rsrp-Threshold SSB), and transmit an MSG1 in the four-step RACH procedure. A base station determines the corresponding SSB index based on related information of the received MSG1, so that an MSG2 in the four-step RACH procedure can be transmitted based on the determined SSB index.

A concept of a cell is obsolete in a cell-free communications system. In this case, the communications system includes a plurality of Access Points (APs). User equipment (UE) communicates with one or more adjacent APs. When the UE moves between APs, a serving AP of the UE changes. In this case, there is no cell identifier (ID), and no inter-cell handover or cell reselection occurs. Usually, N APs adjacent to the UE serve as serving APs of the UE, and therefore the UE is not subject to interference from the adjacent APs.

In this case, the foregoing RACH procedure is no longer applicable to a cell-free network.

SUMMARY

Embodiments of this application provide a random access method, a terminal device, and a network device, to implement random access for a cell-free communications system.

According to a first aspect, a random access method is provided. The method is performed by a terminal device, and the method includes: transmitting first information used for random access, where a preamble carried in the first information is determined based on information of a plurality of target signals; receiving second information transmitted by a network device, where the second information is a random access response to the first information; transmitting third information based on the second information; and receiving fourth information transmitted by the network device, where the fourth information is response information to the third information.

According to a second aspect, a random access method is provided. The method is performed by a network device, and the method includes: receiving first information that is used for random access and that is transmitted by a terminal device, where a preamble carried in the first information is determined based on information of a plurality of target signals; transmitting second information to the terminal device, where the second information is a random access response to the first information: receiving third information transmitted by the terminal device, where the third information is a response to one piece of target second information in the second information; and transmitting fourth information to the terminal device, where the fourth information is response information to the third information.

According to a third aspect, a random access apparatus is provided, including: a first processing module, configured to transmit first information used for random access, where a preamble carried in the first information is determined based on information of a plurality of target signals; a first receiving module, configured to receive second information transmitted by a network device, where the second information is a random access response to the first information; a first transmitting module, configured to transmit third information based on the second information; and a first operation module, configured to receive fourth information transmitted by the network device, where the fourth information is response information to the third information.

According to a fourth aspect, a random access apparatus is provided, including: a second processing module, configured to receive first information that is used for random access and that is transmitted by a terminal device, where a preamble carried in the first information is determined based on information of a plurality of target signals; a second transmitting module, configured to transmit second information to the terminal device, where the second information is a random access response to the first information; a second receiving module, configured to receive third information transmitted by the terminal device, where the third information is a response to one piece of target second information in the second information; and a second operation module, configured to transmit fourth information to the terminal device, where the fourth information is response information to the third information.

According to a fifth aspect, a terminal device is provided, where the terminal device includes a processor, a memory, and a program or instructions stored in the memory and capable of running on the processor, and when the program or instructions are executed by the processor, the steps of the method according to the first aspect are implemented.

According to a sixth aspect, a network device is provided, where the network device includes a processor, a memory, and a program or instructions stored in the memory and capable of running on the processor, and when the program or instructions are executed by the processor, the steps of the method according to the second aspect are implemented.

According to a seventh aspect, a readable storage medium is provided, where the readable storage medium stores a program or instructions, and when the program or instructions are executed by a processor, the steps of the method according to the first aspect or the second aspect are implemented.

According to an eighth aspect, a computer program product is provided, where the computer program product includes a processor, a memory, and a program or instructions stored in the memory and capable of running on the processor, and when the program or instructions are executed by the processor, the steps of the method according to the first aspect or the second aspect are implemented.

According to a ninth aspect, a chip is provided, where the chip includes a processor and a communications interface, the communications interface is coupled to the processor, and the processor is configured to run a program or instructions, to implement the method according to the first aspect or the second aspect.

According to a random access method, a terminal device, and a network device provided in the embodiments of the present disclosure, first information used for random access is transmitted, where a preamble carried in the first information is determined based on information of a plurality of target signals; second information transmitted by a network device is received, where the second information is a random access response to the first information; third information is transmitted based on the second information; and fourth information transmitted by the network device is received, where the fourth information is response information to the third information, so that random access can be implemented for a cell-free communications system.

BRIEF DESCRIPTION OF THE DRAWINGS

FIG. 6 is a schematic flowchart of a random access method according to an embodiment of the present disclosure;

FIG. 8 is a schematic flowchart of a random access method according to an embodiment of the present disclosure;

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that the data used in this way is interchangeable in appropriate circumstances, so that the embodiments of this application can be implemented in other orders than the order illustrated or described herein. In addition, in the specification and claims, "and/or" represents at least one of connected objects, and the character "/" typically represents an "or" relationship between the associated objects.

It should be noted that the technologies described in the embodiments of this application are not limited to a Long Term Evolution (LTE)/LTE-Advanced (LTE-A) system, and may be further used in other wireless communications systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems. The terms "system" and "network" in the embodiments of this application are usually used interchangeably. The described technologies may be used in the aforementioned systems and radio technologies, and may also be used in other systems and radio technologies. However, in the following descriptions, a New Radio (NR) system is described for an illustration purpose, and NR terms are used in most of the following descriptions, but these technologies may also be applied to applications other than an NR system application, for example, a $6^{th}$ Generation (6G) communications system.

Figure 1:
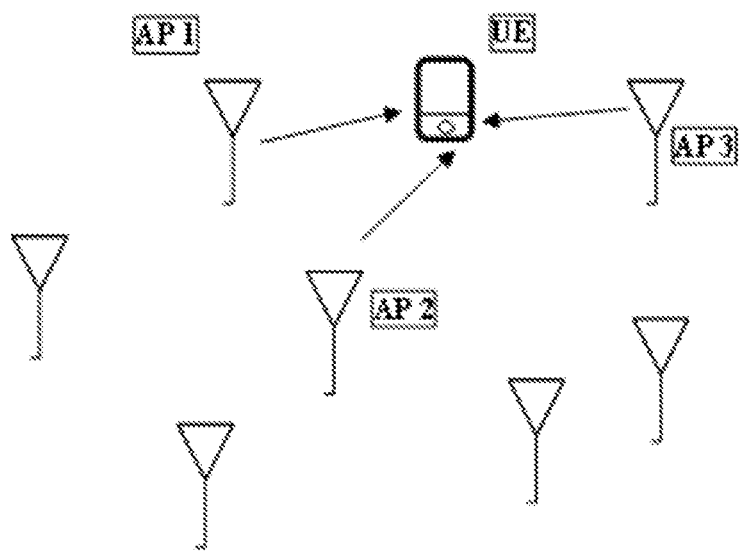
FIG. 1 is a block diagram of a wireless communications system to which an embodiment of this application is applicable.

FIG. 1 is a block diagram of a cell-free wireless communications system to which an embodiment of this application is applicable. The wireless communications system includes a terminal and a plurality of APs. The AP may be a network side device, or may be a terminal. The terminal may also be referred to as a terminal device or UE. The terminal may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a band, a headset, glasses, or the like. It should be noted that a specific type of the terminal is not limited in the embodiments of this application. The network side device may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmitting receiving point (TRP), or another appropriate term in the art. Provided that the same technical effect is achieved, the base station is not limited to a specific technical term. It should be noted that, in the embodiments of this application, a base station in an NR system is merely used as an example, but a specific type of the base station is not limited.

The following describes in detail a random access method provided in the embodiments of this application with reference to the accompanying drawings and by using specific embodiments and application scenarios thereof.

Figure 2:
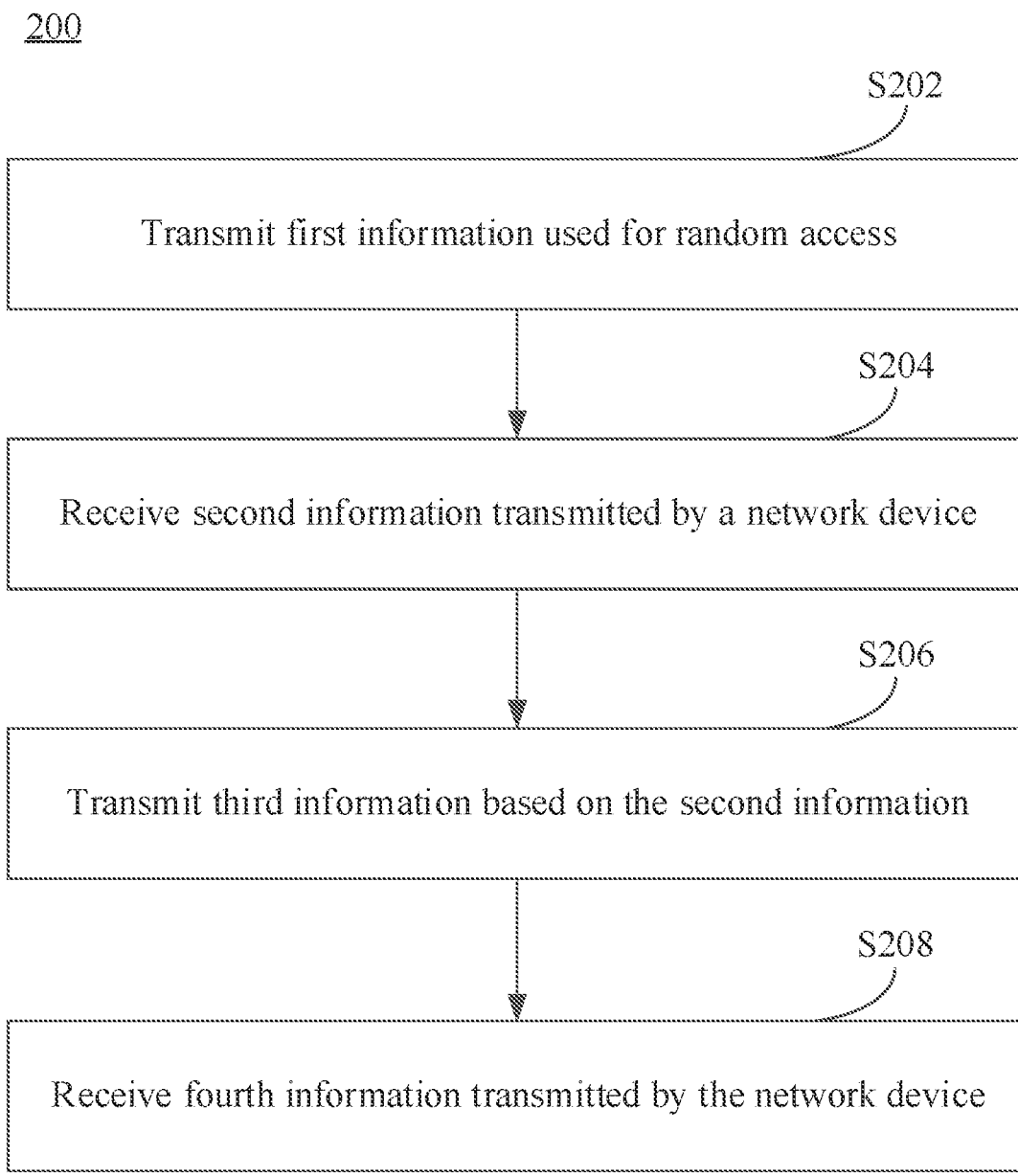
FIG. 2 is a schematic flowchart of a random access method according to an embodiment of the present disclosure.

As shown in FIG. 2, an embodiment of the present disclosure provides a random access method 200. The method may be performed by a terminal device. In other words, the method may be performed by software or hardware installed on the terminal device. The method includes the following steps.

S202: Transmit first information used for random access.

A preamble carried in the first information is determined based on information of a plurality of target signals.

A four-step RACH procedure is used as an example for description.

Compared with a case that a terminal determines a PRACH occasion based on an index of a measured SSB whose SS-RSRP is greater than a preset threshold, for example, rsrp-ThresholdSSB, and transmits an MSG1 in the four-step RACH procedure, in this step, a parameter of the random access preamble is determined based on the information of the plurality of target signals. The plurality of target signals may be transmitted by using a plurality of APs, for example, a plurality of APs corresponding to UE in a cell-free system.

In an implementation, the parameter of the preamble includes a preamble index, a frequency domain resource of the preamble, a time domain resource of the preamble, or the like.

In an implementation, the target signal may include an SSB, a Channel State Information Reference Signal (CSI-RS), a tracking reference signal (TRS), a Demodulation Reference Signal (DMRS), another downlink reference signal, or the like.

In an implementation, the plurality of target signals are indicated by a network device by using random access-related signaling. In an implementation, the random access-related signaling carries at least one of the following information: the index of the preamble, a physical random access channel PRACH mask index, or information about a carrier for transmitting the first information.

In some embodiments, the UE may determine a RACH Occasion (RO) of an MSG1 based on information of N (N>=1) reference signals or synchronization signals indicated by a base station by using signaling, and a PRACH mask index indicated by the base station by using signaling. A preamble index is determined based on a Random Access Preamble index indicated by the base station by using signaling.

In an implementation, the information of the plurality of target signals varies, and the information of the target signal is at least one of the following information or parameters: an index of the target signal, a synchronization raster sync raster, a frequency domain resource, a time domain resource, a sequence format, a quasi-co-location-related parameter, a beam, a transmission configuration indicator TCI, or an associated transmitting receiving point TRP and access point AP.

In some embodiments, sync rasters of the N reference signals or synchronization signals (for example, SSBs) are different. In some embodiments, frequency domain resources of the N reference signals or synchronization signals are different, for example, carriers or Resource Block (RB) are different; or time domain resources of the N reference signals or synchronization signals are different. In some embodiments, sequence formats of the N reference signals or synchronization signals are different. In some embodiments, the N reference signals or synchronization signals are transmitted by using different APs/TRPs, for example, APs/TRP(s) associated with the N SSBs are different. In some embodiments, quasi-co-location-related parameters of the N reference signals or synchronization signals are different, and the like. Examples are not provided one by one herein.

In a case that channel characteristics on a symbol of an antenna port can be deduced from another antenna port, it is considered that the two ports are quasi-co-located (QCL), and a channel estimation result obtained from one port can be used for the other port. For example, it can be considered that the two ports come from the same emitter. QCL configurations may include a plurality of different signal types, such as a channel state information-reference signal (CSI-RS), an SSB, or a sounding reference signal (SRS). For different beams, the network side device may configure QCL configurations corresponding to the beams. The network side device may change a QCL configuration of the UE, to change an operating beam of the terminal.

There are four types of QCL: a type A, a type B, a type C, and a type D. An upper layer transmits a Transmission Configuration Indicator State (TCI-State) to configure QCL. A parameter of the TCI-State is used for configuring a quasi-co-location relationship between one or two downlink reference signals and a DMRS of a PDSCH.

In an implementation, the first information used for random access is the MSG1 in the four-step random access procedure. The UE may determine N pieces of MSG1-related information based on information of N (N>=1) detected target signals, namely, information of reference signals or synchronization signals, and transmit a plurality of MSG1.

In an implementation, the first information is transmitted to a plurality of associated TRPs or APs through a plurality of beams, where the plurality of beams correspond to one or more panels of the terminal device. For example, in a target frequency range (FR), a preamble needs to be transmitted to two TRPs/APs through two beams of one panel or two beams of two panels respectively.

In an implementation, in a cell-free scenario, a plurality of cells/APs share RACH resources, and PCIs/AP IDs associated with corresponding SSBs may be different. The base station notifies the UE of these association relationships by using broadcast signaling or the like. The RACH resources shared by the plurality of cells/APs may be transmitted by using a SIB1 message. To be specific, in the cell-free scenario, broadcasting of a cell/AP includes information about cell-shared RACH resources corresponding to a plurality of nearby cells/APs. To further reduce RACH overheads in the cell-free scenario, information about a plurality of frequencies at which the UE can initiate access may be broadcast in a cell, and the UE may select one frequency from the plurality of frequencies for initiating access.

S204: Receive second information transmitted by the network device.

The second information is a random access response to the first information.

S206: Transmit third information based on the second information.

S208: Receive fourth information transmitted by the network device.

The fourth information is response information to the third information.

In an implementation, the random access method provided in this embodiment of the present disclosure may be applied to a new radio access technology-unlicensed frequency band (New RAT Un-licensed, NR-U), Beam Failure Recovery (BFR), and the like.

According to the random access method provided in this embodiment of the present disclosure, first information used for random access is transmitted, where a preamble carried in the first information is determined based on information of a plurality of target signals; second information transmitted by a network device is received, where the second information is a random access response to the first information; third information is transmitted based on the second information; and fourth information transmitted by the network device is received, where the fourth information is response information to the third information, so that random access can be implemented for a cell-free communications system.

Figure 3:
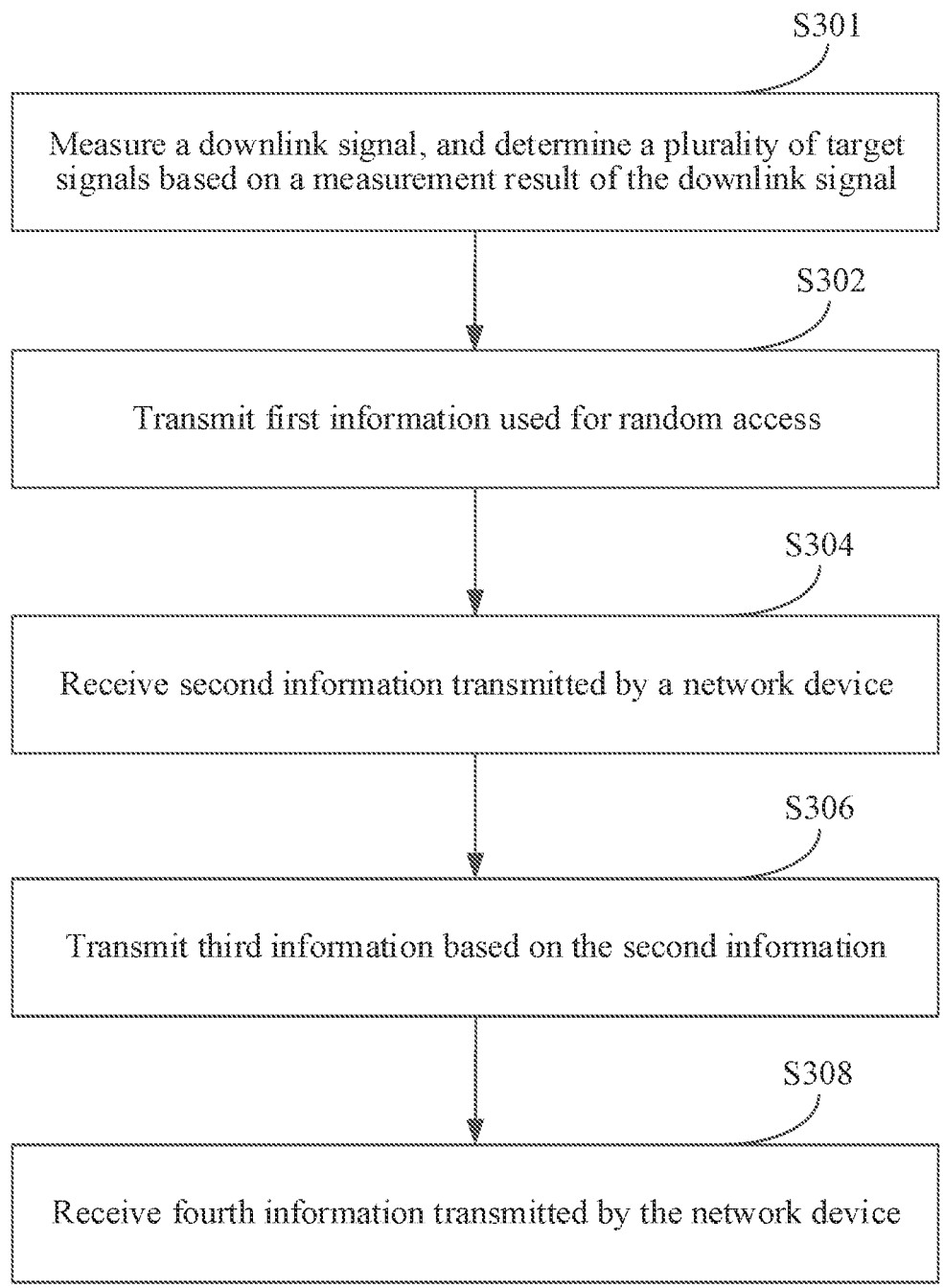
FIG. 3 is a schematic flowchart of a random access method according to an embodiment of the present disclosure.

As shown in FIG. 3, an embodiment of the present disclosure provides a random access method 300. The method may be performed by a terminal device. In other words, the method may be performed by software or hardware installed on the terminal device. The method includes the following steps.

S301: Measure a downlink signal, and determine the plurality of target signals based on a measurement result of the downlink signal.

Target measurement values corresponding to the plurality of target signals meet at least one of the following preset conditions.

In an implementation, the plurality of target signals are obtained through measurement. In this case, the target measurement values corresponding to the plurality of target signals meet a preset condition. The preset condition includes at least one of the following: The target measurement values corresponding to the plurality of target signals are greater than or equal to a first threshold; or a difference between a plurality of target measurement values corresponding to the plurality of target signals is less than or equal to a second threshold.

The target measurement values are at least one of an RSRP, a signal-to-noise and interference ratio (SINR), or reference signal received quality (RSRQ).

In an implementation, the first threshold and/or the second threshold are configured by a network device for the terminal device.

S302: Transmit first information used for random access.

A preamble carried in the first information is determined based on information of the plurality of target signals.

Related descriptions of step S202 in the embodiment of FIG. 2 may be used for this step, and a repeated part is not described herein again.

In addition, the UE may indirectly notify, by using preamble-related information of an MSG1, a base station of information about N (N>=1) SSBs determined through measurement; or may directly notify, through a PUSCH of an MSG3, the base station of the information about the N (N>=1) SSBs determined through measurement.

S304: Receive second information transmitted by the network device.

The second information is a random access response to the first information.

S306: Transmit third information based on the second information.

S308: Receive fourth information transmitted by the network device.

The fourth information is response information to the third information.

Related descriptions of steps S204 to 208 in the embodiment of FIG. 2 may be used for steps S304 to S308, and a repeated part is not described herein again.

According to the random access method provided in this embodiment of the present disclosure, first information used for random access is transmitted, where a preamble carried in the first information is determined based on information of a plurality of target signals; second information transmitted by a network device is received, where the second information is a random access response to the first information; third information is transmitted based on the second information; and fourth information transmitted by the network device is received, where the fourth information is response information to the third information, so that random access can be implemented for a cell-free communications system.

Figure 4:
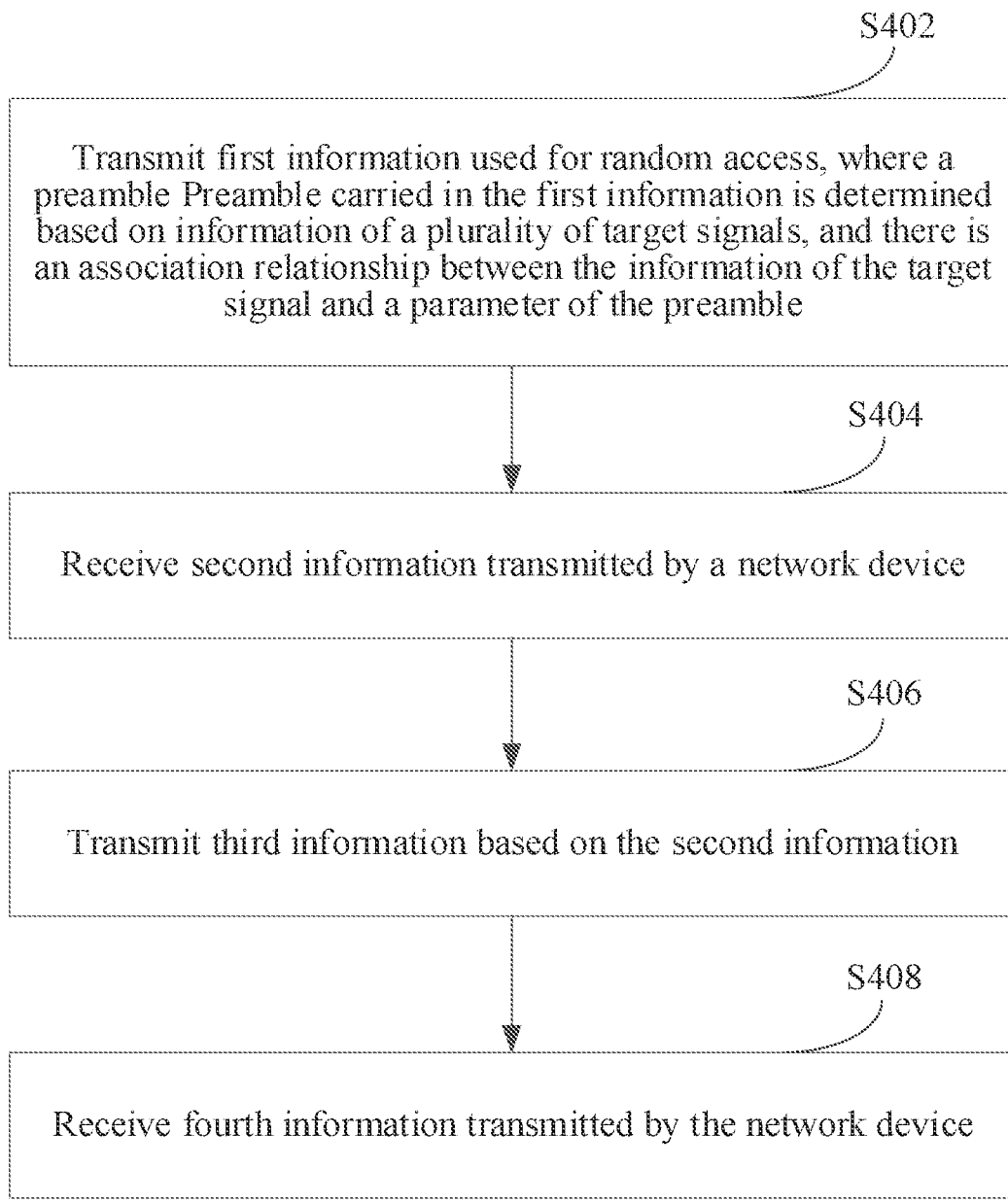
FIG. 4 is a schematic flowchart of a random access method according to an embodiment of the present disclosure.

As shown in FIG. 4, an embodiment of the present disclosure provides a random access method 400. The method may be performed by a terminal device. In other words, the method may be performed by software or hardware installed on the terminal device. The method includes the following steps.

S402: Transmit first information used for random access, where a preamble carried in the first information is determined based on information of a plurality of target signals, and there is an association relationship between the information of the target signal and a parameter of the preamble.

Related descriptions of step S202 in the embodiment of FIG. 2 and step S302 in the embodiment of FIG. 3 may be used for this step, and a repeated part is not described herein again.

In an implementation, there is an association relationship between the information of the target signal and the parameter of the preamble, where the parameter of the preamble includes at least one of an index of the preamble, a frequency domain resource of the preamble, or a time domain resource of the preamble. The information of the target signal includes: an index of the target signal, a synchronization raster sync raster, a frequency domain resource, a time domain resource, a sequence format, a quasi-co-location-related parameter, a beam, a transmission configuration indicator T, and an associated transmitting receiving point TRP and access point AP.

For example, Table 1 shows that there is an association relationship between the information of the target signal and the parameter of the preamble.

TABLE 1

| SSB information | Preamble-related information of an MSG1 |
| --- | --- |
| SSB1, SSB2 | {Preamble index, preamble time domain resource, preamble frequency domain resource} combination 1 |
| SSB2, SSB3 | {Preamble index, preamble time domain resource, preamble frequency domain resource} combination 2 |
| SSB1, SSB3 | {Preamble index, preamble time domain resource, preamble frequency domain resource} combination 3 |
| SSB2, SSB3, SSB1 | {Preamble index, preamble time domain resource, preamble frequency domain resource} combination 4 |
| SSB1 | {Preamble index, preamble time domain resource, preamble frequency domain resource} combination 5 |
| SSB2 | {Preamble index, preamble time domain resource, preamble frequency domain resource} combination 6 |
| SSB3 | {Preamble index, preamble time domain resource, preamble frequency domain resource} combination 7 |

In an implementation, there is an association relationship between the index of the preamble and a preamble sequence format, and the preamble sequence format includes at least one of a sequence length, an SCS, or a root sequence.

In an implementation, the information of the plurality of target signals includes a difference between a plurality of target measurement values corresponding to the plurality of target signals. That is, there is an association relationship between the parameter of the preamble and the difference between the plurality of target measurement values corresponding to the plurality of target signals. For example, a difference between RSRPs of two strongest SSBs (the SSB1 and the SSB3) detected by the UE being 1 dB and a difference between RSRPs of two strongest SSBs (the SSB1 and the SSB3) detected by the UE being 4 dB correspond different {preamble index, preamble time domain resource, preamble frequency domain resource} combinations.

In an implementation, the association relationship between the information of the target signal and the parameter of the preamble is a one-to-one correspondence.

In an implementation, parameters of the preamble that correspond to the information of the plurality of target signals are determined based on the correspondence.

In an implementation, parameters of the preamble that correspond to the information of the plurality of target signals are determined based on the association relationship between the information of the target signal and the parameter of the preamble. In some embodiments, the determining, based on the association relationship between the information of the target signal and the parameter of the preamble, parameters of the preamble that correspond to the information of the plurality of target signals may include two implementations.

Manner 1: ROs associated with the plurality of target signals are determined, and a first target preamble is determined from a plurality of preambles corresponding to one or more ROs associated with the plurality of target signals.

Manner 2: ROs associated with the plurality of target signals are determined; one RO is selected from the ROs associated with the plurality of target signals, where a preamble corresponding to the selected RO is used as a preamble candidate set; and a second target preamble is determined from the preamble candidate set.

S404: Receive second information transmitted by the network device.

The second information is a random access response to the first information.

S406: Transmit third information based on the second information.

S408: Receive fourth information transmitted by the network device.

The fourth information is response information to the third information.

Related descriptions of steps S204 to 208 in the embodiment of FIG. 2 may be used for steps S404 to S308, and a repeated part is not described herein again.

According to the random access method provided in this embodiment of the present disclosure, first information used for random access is transmitted, where a preamble carried in the first information is determined based on information of a plurality of target signals; second information transmitted by a network device is received, where the second information is a random access response to the first information; third information is transmitted based on the second information; and fourth information transmitted by the network device is received, where the fourth information is response information to the third information, so that random access can be implemented for a cell-free communications system.

Figure 5:
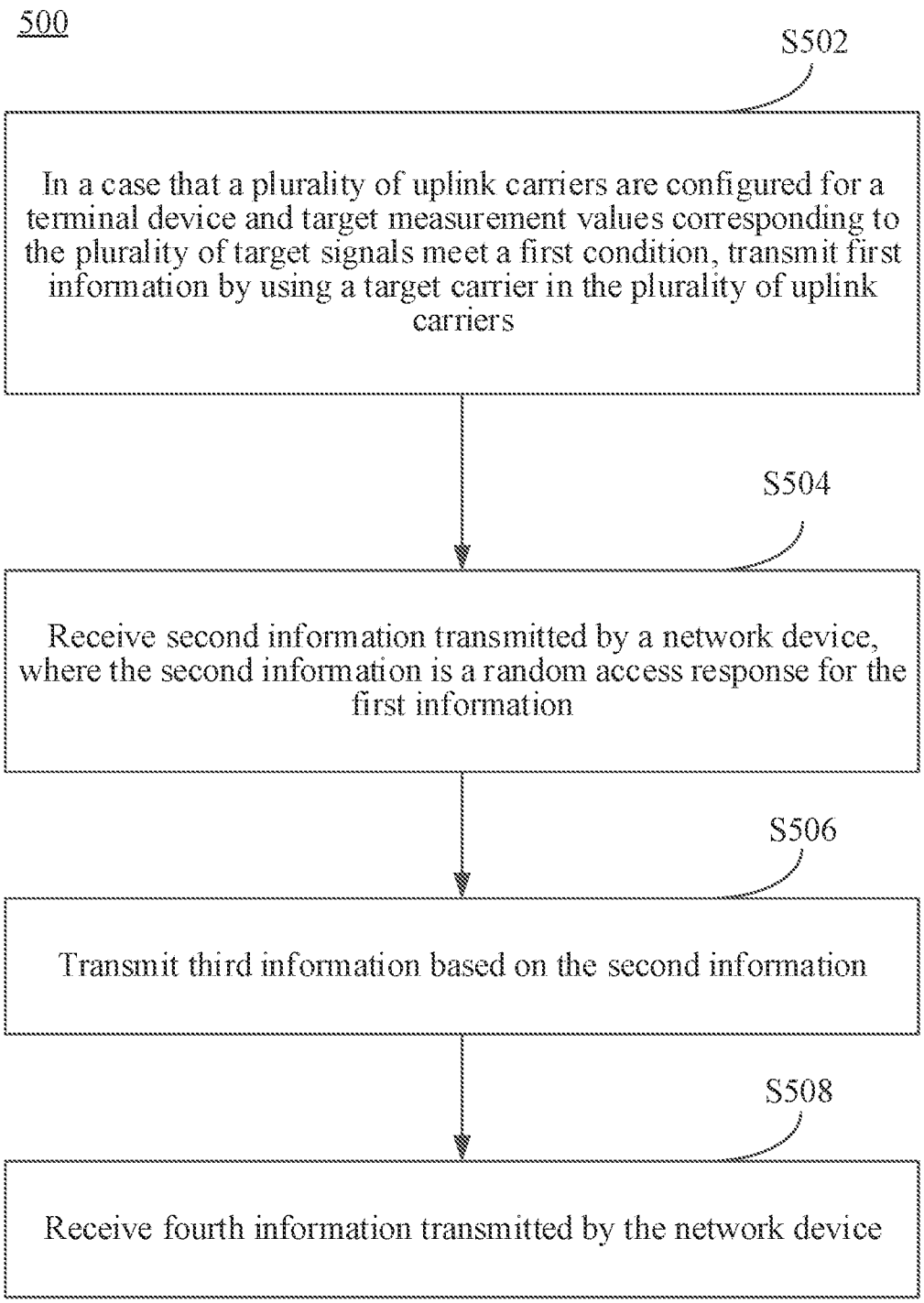
FIG. 5 is a schematic flowchart of a random access method according to an embodiment of the present disclosure.

As shown in FIG. 5, an embodiment of the present disclosure provides a random access method 500. The method may be performed by a terminal device. In other words, the method may be performed by software or hardware installed on the terminal device. The method includes the following steps.

S502: In a case that a plurality of uplink carriers are configured for the terminal device and target measurement values corresponding to the plurality of target signals meet a first condition, transmit the first information by using a target carrier in the plurality of uplink carriers.

Related descriptions of step S202 in the embodiment of FIG. 2, step S302 in the embodiment of FIG. 3, and step S402 in the embodiment of FIG. 4 may be used for this step, and a repeated part is not described herein again.

In an implementation, before the first information used for random access is transmitted, a random access Radio Network Temporary Identifier (RNTI) may be determined based on the target carrier.

In an implementation, in a case that the target measurement values corresponding to the plurality of target signals are greater than a fourth threshold, the first information is transmitted by using a first carrier in the plurality of uplink carriers; or in a case that a target measurement value corresponding to at least one of the plurality of target signals is not greater than the fourth threshold, the first information is transmitted by using a second carrier in the plurality of uplink carriers, where a frequency of the first carrier is higher than that of the second carrier.

For example, in a case that a plurality of uplink carriers, such as a high-frequency carrier and a low-frequency carrier, are configured for the UE to transmit a preamble, if RSRPs/SINRs/RSRQ of N reference signals or synchronization signals are all less than a fourth threshold, the UE transmits an MSG1 by using a target carrier (for example, a carrier with a lower frequency); otherwise, transmits the MSG1 by using another carrier (for example, a carrier with a higher frequency). A calculation formula for determining a random access RNTI (RA-RNTI) is related to a specific carrier used for transmitting the preamble, for example, is related to a carrier ID.

In an implementation, a scrambling sequence used for PUSCH data of the first information is as follows:

$$C_{init} = n_{RNTI} \times 2^{16} + n_{RAPID} \times 2^{10} + n_{ID}, \text{ where}$$

$n_{RNTI}$ is the random access RNTI and is determined by a time-frequency resource location of a random access occasion RO, $n_{RAPID}$ indicates an index of the preamble, and $n_{ID}$ indicates a cell identifier ID.

S504: Receive second information transmitted by a network device, where the second information is a random access response to the first information.

S506: Transmit third information based on the second information.

S508: Receive fourth information transmitted by the network device.

The fourth information is response information to the third information.

Related descriptions of steps S204 to 208 in the embodiment of FIG. 2 may be used for steps S504 to S508, and a repeated part is not described herein again.

According to the random access method provided in this embodiment of the present disclosure, first information used for random access is transmitted, where a preamble carried in the first information is determined based on information of a plurality of target signals; second information transmitted by a network device is received, where the second information is a random access response to the first information; third information is transmitted based on the second information; and fourth information transmitted by the network device is received, where the fourth information is response information to the third information, so that random access can be implemented for a cell-free communications system.

As shown in FIG. 6, an embodiment of the present disclosure provides a random access method 600. The method may be performed by a terminal device. In other words, the method may be performed by software or hardware installed on the terminal device. The method includes the following steps.

S601: Determine a transmit power for the first information for random access based on path loss values of the plurality of target signals.

Each target signal corresponds to a respective path loss value. RSRPs of a plurality of SSBs associated with the first information are considered. For example, the plurality of SSBs are transmitted by using a plurality of APs. This means that losses of paths from the plurality of APs to the terminal are considered in the transmit power for the first information.

S602: Transmit the first information used for random access, where a preamble carried in the first information is determined based on information of the plurality of target signals.

Related descriptions of step S202 in the embodiment of FIG. 2, step S302 in the embodiment of FIG. 3, step S402 in the embodiment of FIG. 4, and step S502 in the embodiment of FIG. 5 may be used for this step, and a repeated part is not described herein again.

S604: Receive second information transmitted by a network device.

The second information is a random access response to the first information.

S606: Transmit third information based on the second information.

S608: Receive fourth information transmitted by the network device.

The fourth information is response information to the third information.

Related descriptions of steps S204 to 208 in the embodiment of FIG. 2 may be used for steps S604 to S608, and a repeated part is not described herein again.

According to the random access method provided in this embodiment of the present disclosure, first information used for random access is transmitted, where a preamble carried in the first information is determined based on information of a plurality of target signals; second information transmitted by a network device is received, where the second information is a random access response to the first information; third information is transmitted based on the second information; and fourth information transmitted by the network device is received, where the fourth information is response information to the third information, so that random access can be implemented for a cell-free communications system.

Figure 7:
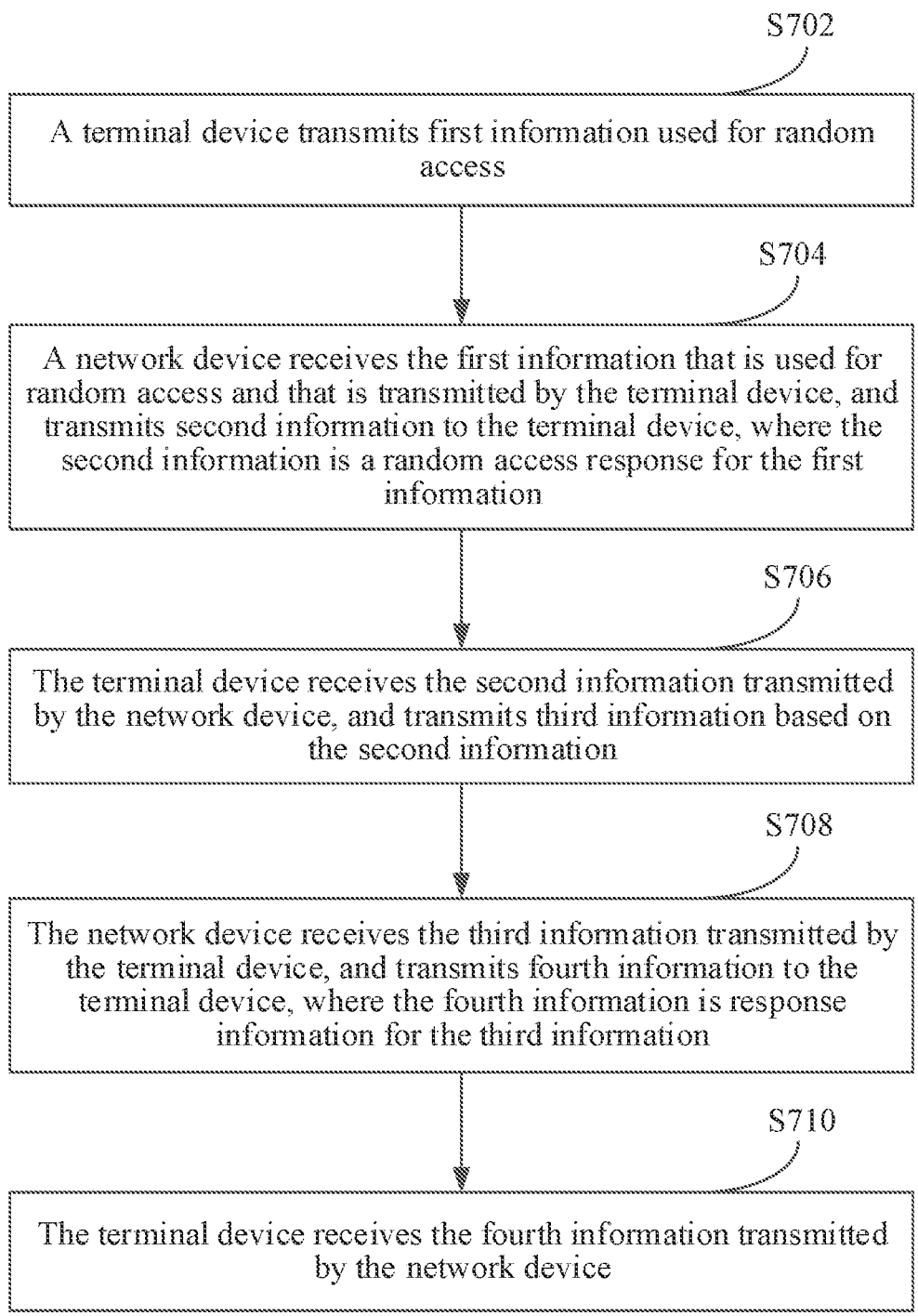
FIG. 7 is a schematic flowchart of a random access method according to an embodiment of the present disclosure.

As shown in FIG. 7, an embodiment of the present disclosure provides a random access method 700. The method may be performed by a terminal device and/or a network device. In other words, the method may be performed by software or hardware installed on the terminal device and/or the network device. The method includes the following steps.

S702: The terminal device transmits first information used for random access.

A preamble carried in the first information is determined based on information of a plurality of target signals. Related descriptions of step S202 in the embodiment of FIG. 2, step S302 in the embodiment of FIG. 3, step S402 in the embodiment of FIG. 4, step S502 in the embodiment of FIG. 5, and step S602 in the embodiment of FIG. 6 may be used for this step, and a repeated part is not described herein again.

S704: The network device receives the first information that is used for random access and that is transmitted by the terminal device, and transmits second information to the terminal device, where the second information is a random access response to the first information.

Related descriptions of step S204 in the embodiment of FIG. 2, step S304 in the embodiment of FIG. 3, step S404 in the embodiment of FIG. 4, step S504 in the embodiment of FIG. 5, and step S604 in the embodiment of FIG. 6 may be used for this step, and a repeated part is not described herein again.

The network device determines, based on the information of the plurality of target signals corresponding to the preamble, a parameter for transmitting the second information, and transmits the second information to the terminal device The parameter of the second information includes at least one of access point information, beam information, quasi-co-location information, or transmission configuration indicator information.

A transmitting manner of transmitting the second information includes one of the following manners.

Manner 1: A plurality of pieces of second information are transmitted based on a plurality of quasi-co-location-related parameters corresponding to the plurality of target signals. For example, a base station transmits an MSG2 to the UE by using N quasi-co-location-related parameters corresponding to N SSB indexes, where the N quasi-co-location-related parameters correspond to different TBs or the same TB, and N≥2 An upper layer configures QCL by using a TCI-State.

Manner 2: The second information is transmitted based on at least one first quasi-co-location-related parameter corresponding to the plurality of target signals. For example, the base station transmits an MSG2 to the UE by using X (N>X>1) quasi-co-location-related parameters of N quasi-co-location-related parameters corresponding to N SSB indexes. An upper layer configures QCL by using a TCI-State.

Manner 3: The second information is transmitted based on a second quasi-co-location-related parameter, where the second quasi-co-location-related parameter is different from the plurality of quasi-co-location-related parameters corresponding to the plurality of target signals. In other words, the second information is transmitted by using a second quasi-co-location-related parameter corresponding to a signal other than the target signals. For example, the base station transmits an MSG2 to the UE by using a quasi-co-location-related parameter corresponding to an SSB different from the N SSB indexes. In this case, the UE needs to detect the new SSB and receive the MSG2 in a four-step RACH. Different SSBs or quasi-co-location-related parameters may correspond to one or more APs.

In an implementation, the MSG2 includes new QCL/TCI information, which is, for example, different from QCL/TCI of a previous SSB. For example, the MSG2 includes the new QCL information, the UE receives an MSG4 by using the new QCL/TCI information. When receiving the MSG2, the UE assumes N TCIs corresponding to the N SSB indexes or one piece of TCI information corresponding to one SSB.

In an implementation, after receiving the MSG1, the base station may determine information about an AP or a beam for transmitting the MSG2, thereby enhancing transmission reliability of the MSG1 and the MSG2, and improving reliability of a random access procedure in a cell-free network.

Correspondingly, the terminal device receives the second information transmitted by the network device in S708.

In an implementation, in a case that the number of APs associated with the plurality of target signals is greater than or equal to 2, a second time interval between a time at which the terminal device transmits the first information and a time at which the terminal device receives the second information is greater than or equal to a first time interval, where the first time interval is a time interval between a time at which the terminal device transmits the first information and a time at which the terminal device receives the second information in a case that the number of APs associated with the plurality of target signals is 1.

For example, in a case that the number of APs associated with N SSBs associated with the MSG1 is greater than or equal to 2 and a time interval is X1, two or more APs need to receive the MSG1 and perform joint reception in uplink, and received data needs to be aggregated among a plurality of APs. As a result, a delay T1 of processing the MSG1 by the base station is greater than a delay T2 of processing the MSG1 by one AP. For another example, in a case that the number of APs associated with N SSBs associated with the MSG1 is 1 and a time interval is X2 (X2<=X1).

In a case that the UE successfully receives a RAR (decoded by using an RA-RNTI) and a preamble index in the RAR is the same as a preamble index transmitted by the UE, it is considered that the RAR is successfully received. In this case, the UE may stop listening to the RAR.

S706: The terminal device receives the second information transmitted by the network device, and transmits third information based on the second information.

The second information is a random access response to the first information. In some embodiments, the terminal device receives one or more pieces of second information transmitted by the network device, where target information in the second information is determined by the network device based on the first information, the second information includes first parameter information, the indicated first parameter information is different from the information of the target signals. The first parameter information indicated in the second information includes at least one of an AP, a TRP, a beam, quasi-co-location, or a transmission configuration indicator (TCI).

In an implementation, the first information is retransmitted in a case that the terminal device does not receive the second information or the received second information does not carry a preamble index. In addition, a transmit power is increased based on the number of retransmissions in a case that the first information is retransmitted, to increase a reception success rate. A transmission format of the first information remains unchanged in a case that the first information is retransmitted.

In some embodiments, the transmit power is determined based on the following formula:

$$P_{PRACH,b,f,c}(i) = \min\{P_{CMAX,f,c}(i), P_{PRACH,target,f,c} + PL_{b,f,c}\}, \text{ where}$$

$P_{PRACH,b,f,c}(i)$ is a transmit power of a physical random access channel (PRACH), $P_{CMAX,f,c}(i)$ is a maximum output power configured for UE used on a serving cell carrier in a transmission scenario, $P_{PRACH,target,f,c}$ is a PRACH target received power-preamble received target power provided by an upper layer for an active UL BWP of the serving cell carrier, and $PL_{b,f,c}$ is a path loss of an active uplink bandwidth part UL-BWP of a carrier associated with PRACH transmission on an active downlink bandwidth part (DL-BWP) of a serving cell.

In some embodiments, $PL_{b,f,c} = \Sigma_{k=0}^{n} PL_{b,f,c,k}$, and is the path loss of the active UL-BWP of the carrier associated with the PRACH transmission on the active DL-BWP of the serving cell.

In a case that the UE successfully receives a RAR and a preamble index (namely, RAPID, Random Access Preamble Identifier) carried in the RAR is the same as a preamble index transmitted by the UE, the UE transmits an MSG3.

The MSG3 implicitly (for example, by using a scrambling sequence of a DMRS) or explicitly (for example, by using a bit of the MSG3) indicates that the UE has successfully received an SSB index, a TCI, or quasi-co-location-related parameter information that corresponding to the MSG2.

The terminal device determines one piece of target second information from one or more pieces of second information; and responds to the target second information to transmit the third information; and determines, based on the target second information, quasi-co-location information for receiving fourth information. That is, the determined target MSG2 is consistent with the QCL of the MSG4.

S708. The network device receives the third information transmitted by the terminal device, and transmits fourth information to the terminal device, where the fourth information is response information to the third information.

The third information is a response to one piece of target second information in the second information.

If the base station successfully receives the MSG3, the base station transmits the MSG4.

The first information is the MSG1 in the four-step random access procedure, the second information is the MSG2 in the four-step random access procedure, the third information is the MSG3 in the four-step random access procedure, and the fourth information is the MSG4 in the four-step random access procedure.

S710: The terminal device receives the fourth information transmitted by the network device.

The fourth information is response information to the third information, so as to complete the RACK.

According to the random access method provided in this embodiment of the present disclosure, first information used for random access is transmitted, where a preamble carried in the first information is determined based on information of a plurality of target signals; second information transmitted by a network device is received, where the second information is a random access response to the first information; third information is transmitted based on the second information; and fourth information transmitted by the network device is received, where the fourth information is response information for the third information, so that random access can be implemented for a cell-free communications system.

In addition, in an implementation different from the embodiments of FIG. 2 to FIG. 7, that the preamble carried in the first information is determined based on the information of the plurality of target signals may include: The preamble is determined based on information of one of the plurality of target signals.

In addition, after information of an associated uplink shared channel PUSCH and information of a demodulation reference signal DMRS are determined, the method further includes: transmitting a PUSCH, where the PUSCH includes at least one of: a plurality of target signals meeting a preset parameter requirement, or target measurement values corresponding to a plurality of target signals meeting a preset parameter requirement.

The random access method according to the embodiments of the present disclosure is described above in detail with reference to FIG. 2 to FIG. 7. A random access method according to another embodiment of the present disclosure is described below in detail with reference to FIG. 8. It may be understood that interaction between a network device and a terminal device described from the network device side is the same as or corresponds to the description on the terminal device side in the methods shown in FIG. 2 to FIG. 7. Related descriptions are properly omitted to avoid repetition.

FIG. 8 is a schematic diagram of an implementation process of a random access method according to an embodiment of the present disclosure. The method may be applied to a network device side. As shown in FIG. 8, the method 800 includes the following steps.

S802: Receive first information that is used for random access and that is transmitted by a terminal device, where a preamble carried in the first information is determined based on information of a plurality of target signals.

Related descriptions of step S202 in the embodiment of FIG. 2, step S302 in the embodiment of FIG. 3, step S402 in the embodiment of FIG. 4, step S502 in the embodiment of FIG. 5, step S602 in the embodiment of FIG. 6, and step S702 in the embodiment of FIG. 7 may be used for this step, and a repeated part is not described herein again.

S804: Transmit second information to the terminal device, where the second information is a random access response to the first information.

Related descriptions of step S204 in the embodiment of FIG. 2, step S304 in the embodiment of FIG. 3, step S404 in the embodiment of FIG. 4, step S504 in the embodiment of FIG. 5, step S604 in the embodiment of FIG. 6, and step S704 in the embodiment of FIG. 7 may be used for this step, and a repeated part is not described herein again.

S806: Receive third information transmitted by the terminal device, where the third information is a response to one piece of target second information in the second information.

Related descriptions of step S206 in the embodiment of FIG. 2, step S306 in the embodiment of FIG. 3, step S406 in the embodiment of FIG. 4, step S506 in the embodiment of FIG. 5, step S606 in the embodiment of FIG. 6, and step S706 in the embodiment of FIG. 7 may be used for this step, and a repeated part is not described herein again.

S808: Transmit fourth information to the terminal device, where the fourth information is response information to the third information.

Related descriptions of step S208 in the embodiment of FIG. 2, step S308 in the embodiment of FIG. 3, step S408 in the embodiment of FIG. 4, step S508 in the embodiment of FIG. 5, step S608 in the embodiment of FIG. 6, and step S708 in the embodiment of FIG. 7 may be used for this step, and a repeated part is not described herein again.

It should be noted that the random access method provided in the embodiments of this application may be performed by a random access apparatus, or by a control module that is in the apparatus and that is configured to load the foregoing method. In the embodiments of this application, the random access method provided in the embodiments of this application is described by using an example in which a random access apparatus performs the random access method.

Figure 9:
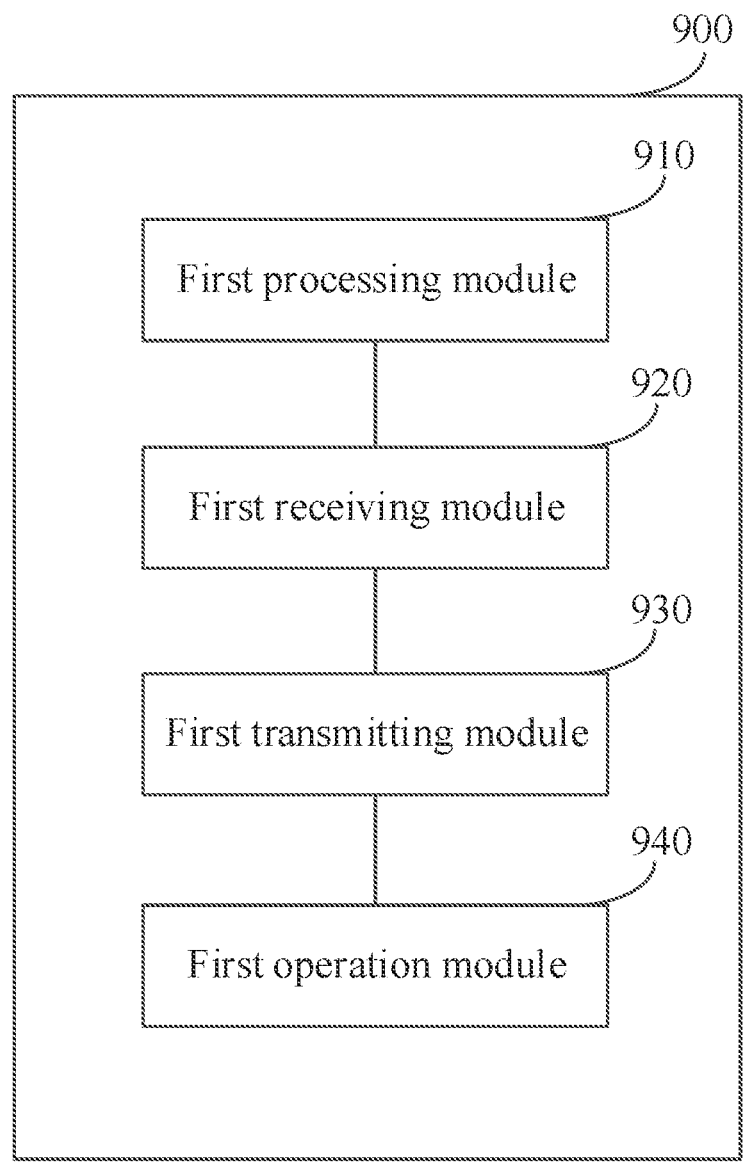
FIG. 9 is a schematic structural diagram of a random access apparatus according to an embodiment of the present disclosure.

FIG. 9 is a schematic structural diagram of a random access apparatus according to an embodiment of the present disclosure. As shown in FIG. 9, the random access apparatus 900 includes a first processing module 910, a first receiving module 920, a first transmitting module 930, and a first operation module 940.

The first processing module 910 is configured to transmit first information used for random access, where a preamble Preamble carried in the first information is determined based on information of a plurality of target signals.

The first receiving module 920 is configured to receive second information transmitted by a network device, where the second information is a random access response to the first information.

The first transmitting module 930 is configured to transmit third information based on the second information.

The first operation module 940 is configured to receive fourth information transmitted by the network device, where the fourth information is response information to the third information.

In an implementation, the information of the plurality of target signals varies, and the information of the target signal is at least one of the following: an index of the target signal, a synchronization raster sync raster, a frequency domain resource, a time domain resource, a sequence format, a quasi-co-location-related parameter, a beam, a transmission configuration indicator (TCI), or an associated transmitting receiving point (TRP) and access point (AP).

In an implementation, the first processing module 910 is configured to: before transmitting the first information used for random access, measure a downlink signal; and determine the plurality of target signals based on a measurement result of the downlink signal, where target measurement values corresponding to the plurality of target signals meet at least one of the following preset conditions: the target measurement values corresponding to the plurality of target signals are greater than or equal to a first threshold; or a difference between a plurality of target measurement values corresponding to the plurality of target signals is less than or equal to a second threshold, where the target measurement values are at least one of a reference signal received power (RSRP), a signal-to-noise and interference ratio (SINR), or reference signal received quality (RSRQ).

In an implementation, the first threshold and/or the second threshold are configured by a network device for the terminal device.

In an implementation, the plurality of target signals are indicated by a network device by using random access-related signaling.

In an implementation, the random access-related signaling carries at least one of the following information: the index of the preamble, a physical random access channel (PRACH) mask index, or information about a carrier for transmitting the first information.

In an implementation, there is an association relationship between the information of the target signal and the parameter of the preamble, where the parameter of the preamble includes at least one of an index of the preamble, a frequency domain resource of the preamble, or a time domain resource of the preamble.

In an implementation, there is an association relationship between the index of the preamble and a preamble sequence format, and the preamble sequence format includes at least one of a sequence length, a subcarrier spacing (SCS), or a root sequence.

In an implementation, the information of the plurality of target signals includes a difference between a plurality of target measurement values corresponding to the plurality of target signals.

In an implementation, the association relationship between the information of the target signal and the parameter of the preamble is a one-to-one correspondence.

In an implementation, the first processing module 910 is configured to: before transmitting the first information used for random access, determine, based on the association relationship between the information of the target signal and the parameter of the preamble, parameters of the preamble that correspond to the information of the plurality of target signals.

In an implementation, that the first processing module 910 is configured to determine, based on the association relationship between the information of the target signal and the parameter of the preamble, parameters of the preamble that correspond to the information of the plurality of target signals includes: determining random access occasions ROs associated with the plurality of target signals; and determining a first target preamble from a plurality of preambles corresponding to the ROs associated with the plurality of target signals.

In an implementation, that the first processing module 910 is configured to determine, based on the association relationship between the information of the target signal and the parameter of the preamble, parameters of the preamble that correspond to the information of the plurality of target signals includes: determining ROs associated with the plurality of target signals; selecting one RO from the ROs associated with the plurality of target signals, where a preamble corresponding to the selected RO is used as a preamble candidate set; and determining a second target preamble from the preamble candidate set.

In an implementation, the first processing module 910 is configured to: in a case that a plurality of uplink carriers are configured for the terminal device and target measurement values corresponding to the plurality of target signals meet a first condition, transmit the first information by using a target carrier in the plurality of uplink carriers.

In an implementation, the in a case that a plurality of uplink carriers are configured for the terminal device and target measurement values corresponding to the plurality of target signals meet a first condition, transmitting the first information by using a target carrier in the plurality of uplink carriers includes: in a case that the target measurement values corresponding to the plurality of target signals are greater than a fourth threshold, transmitting the first information by using a first carrier in the plurality of uplink carriers; or in a case that a target measurement value corresponding to at least one of the plurality of target signals is not greater than the fourth threshold, transmitting the first information by using a second carrier in the plurality of uplink carriers, where a frequency of the first carrier is higher than that of the second carrier.

In an implementation, the first processing module 910 is configured to: before transmitting the first information used for random access, determine a random access radio network temporary identifier RNTI based on the target carrier.

In an implementation, the first processing module 910 is configured to: before transmitting the first information used for random access, determine a transmit power for the first information for random access based on path loss values of the plurality of target signals, where each target signal corresponds to a respective path loss value.

In an implementation, the first processing module 910 is configured to transmit the first information to a plurality of associated TRPs or APs through a plurality of beams respectively, where the plurality of beams correspond to one or more panels of the terminal device.

In an implementation, the receiving second information transmitted by a network device includes one of the following manners: receiving a plurality of pieces of second information based on a plurality of quasi-co-location-related parameters corresponding to the plurality of target signals; receiving the second information based on at least one first quasi-co-location-related parameter corresponding to the plurality of target signals; or receiving the second information based on a second quasi-co-location-related parameter, where the second quasi-co-location-related parameter is different from the plurality of quasi-co-location-related parameters corresponding to the plurality of target signals.

In an implementation, the second information carries frequency domain location information corresponding to the fourth information.

In an implementation, in a case that the number of APs associated with the plurality of target signals is greater than or equal to 2, a second time interval between a time at which the terminal device transmits the first information and a time at which the terminal device receives the second information is greater than or equal to a first time interval, where the first time interval is a time interval between a time at which the terminal device transmits the first information and a time at which the terminal device receives the second information in a case that the number of APs associated with the plurality of target signals is 1.

In an implementation, the second information includes first parameter information, and the first parameter information is different from the information of the target signal.

In an implementation, the first parameter information includes at least one of an AP, a TRP, a beam, quasi-co-location, or a transmission configuration indicator TCI.

In an implementation, the first processing module 910 is configured to retransmit the first information in a case that the terminal device does not receive the second information or the received second information does not carry a preamble index.

In an implementation, a transmit power is increased based on the number of retransmissions in a case that the first information is retransmitted.

In an implementation, a transmission format of the first information remains unchanged in a case that the first information is retransmitted.

In an implementation, the first processing module 910 is configured to: after a plurality of pieces of second information transmitted by the network device are received, determine one piece of target second information from the plurality of pieces of second information; and respond to the target second information to transmit the third information.

In an implementation, the first processing module 910 is configured to: after the third information is transmitted, determine, based on the target second information, quasi-co-location information for receiving the fourth information.

In an implementation, the first information is an MSG1 in a four-step random access procedure, the second information is an MSG2 in the four-step random access procedure, the third information is an MSG3 in the four-step random access procedure, and the fourth information is an MSG4 in the four-step random access procedure.

The random access apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, or a self-service machine. This is not specifically limited in this embodiment of this application.

The random access apparatus in this embodiment of this application may be an apparatus with an operating system. The operating system may be an Android operating system, may be an iOS operating system, or may be another possible operating system. This is not specifically limited in this embodiment of this application.

For the apparatus 900 according to this embodiment of the present disclosure, refer to the corresponding process of the method 200 to 700 in the embodiment of the present disclosure. In addition, the units/modules in the apparatus 900 and the foregoing other operations and/or functions are respectively intended to implement the corresponding processes performed by the terminal device in the methods 200 to 700, with the same or equivalent technical effects achieved. For brevity, details are not described herein again.

Figure 10:
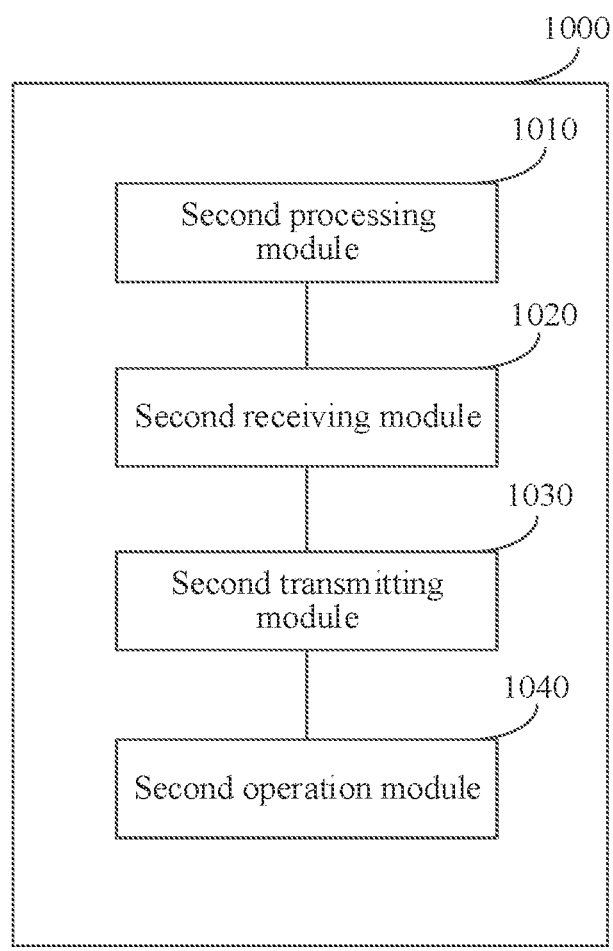
FIG. 10 is a schematic structural diagram of a random access apparatus according to an embodiment of the present disclosure.

FIG. 10 is a schematic structural diagram of a random access apparatus according to an embodiment of the present disclosure. As shown in FIG. 10, the random access apparatus 1000 includes a second processing module 1010, a second transmitting module 1020, a second receiving module 1030, and a second operation module 1040.

The second processing module 1010 is configured to receive first information that is used for random access and that is transmitted by a terminal device, where a preamble Preamble carried in the first information is determined based on information of a plurality of target signals.

The second transmitting module 1020 is configured to transmit second information to the terminal device, where the second information is a random access response to the first information.

The second receiving module 1030 is configured to receive third information transmitted by the terminal device, where the third information is a response to one piece of target second information in the second information.

The second operation module 1040 is configured to transmit fourth information to the terminal device, where the fourth information is response information to the third information. In an implementation, the second transmitting module 1020 is configured to: before the first information for random access is received, transmit random access-related signaling used for indicating the plurality of target signals.

In an implementation, the second processing module 1010 is configured to: in a case that a plurality of uplink carriers are configured for the terminal device and target measurement values corresponding to the plurality of target signals meet a first condition, receive the first information by using a target carrier in the plurality of uplink carriers.

In an implementation, the second processing module 1010 is configured to: in a case that the target measurement values corresponding to the plurality of target signals are greater than a fourth threshold, receive the first information by using a first carrier in the plurality of uplink carriers; or in a case that a target measurement value corresponding to at least one of the plurality of target signals is not greater than the fourth threshold, receive the first information by using a second carrier in the plurality of uplink carriers, where a frequency of the first carrier is higher than that of the second carrier.

In an implementation, a transmitting manner of transmitting the second information includes one of the following manners: transmitting a plurality of pieces of second information based on a plurality of quasi-co-location-related parameters corresponding to the plurality of target signals; transmitting the second information based on at least one first quasi-co-location-related parameter corresponding to the plurality of target signals; or transmitting the second information based on a second quasi-co-location-related parameter, where the second quasi-co-location-related parameter is different from the plurality of quasi-co-location-related parameters corresponding to the plurality of target signals.

In an implementation, in a case that the number of APs associated with the plurality of target signals is greater than or equal to 2, a second time interval between a time at which the terminal device transmits the first information and a time at which the terminal device receives the second information is greater than or equal to a first time interval, where the first time interval is a time interval between a time at which the terminal device transmits the first information and a time at which the terminal device receives the second information in a case that the number of APs associated with the plurality of target signals is 1.

In an implementation, the second information includes first parameter information, and the first parameter information is different from the information of the target signal.

In an implementation, the first parameter information includes at least one of an AP, a TRP, a beam, quasi-co-location, or a transmission configuration indicator (TCI).

In an implementation, the second processing module 1010 is configured to: before the fourth information is transmitted to the terminal device, determine, based on the target second information, quasi-co-location information for transmitting the fourth information.

In an implementation, the first information is an MSG1 in a four-step random access procedure, the second information is an MSG2 in the four-step random access procedure, the third information is an MSG3 in the four-step random access procedure, and the fourth information is an MSG4 in the four-step random access procedure.

The random access apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a server, a network attached storage (NAS), a personal computer (PC), a television (TV), a teller machine, or a self-service machine. This is not specifically limited in this embodiment of this application.

The random access apparatus in this embodiment of this application may be an apparatus with an operating system. The operating system may be an Android operating system, may be an iOS operating system, or may be another possible operating system. This is not specifically limited in this embodiment of this application.

For the apparatus 1000 according to this embodiment of the present disclosure, refer to the corresponding process of the method 200-700 in the embodiment of the present disclosure. In addition, the units/modules in the apparatus 1000 and the foregoing other operations and/or functions are respectively intended to implement the corresponding processes performed by the network device in the methods 700 to 800, with the same or equivalent technical effects achieved. For brevity, details are not described herein again.

Figure 11:
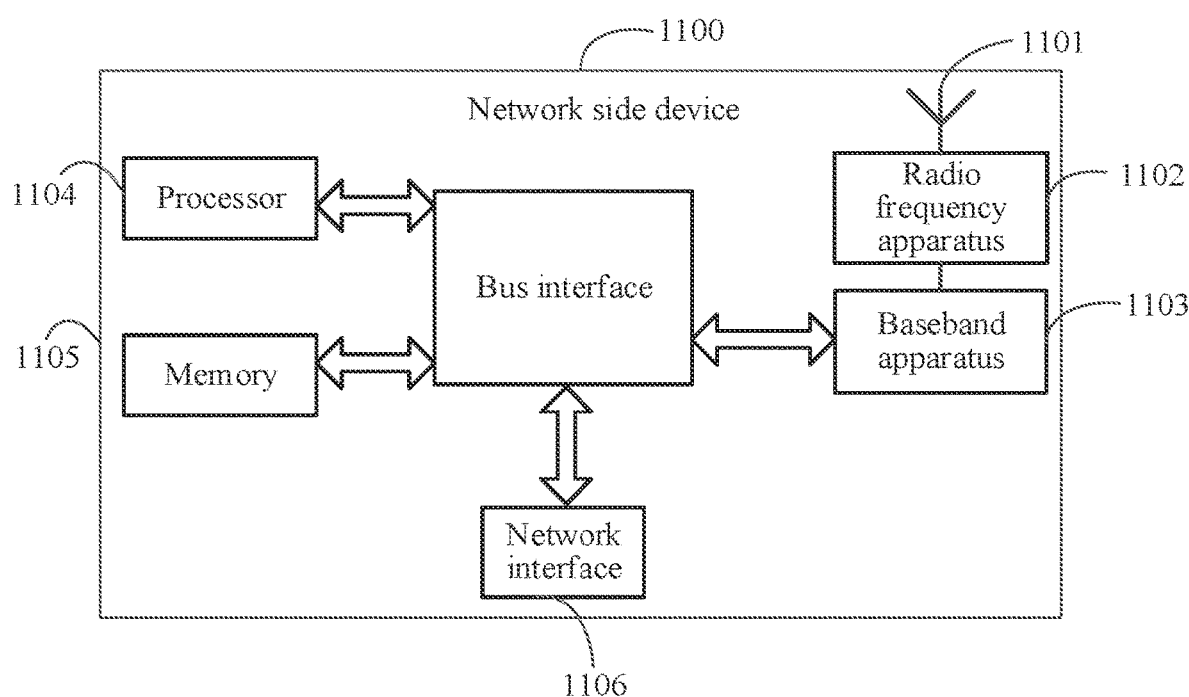
FIG. 11 is a schematic structural diagram of a network device according to another embodiment of the present disclosure.

An embodiment of this application further provides a network side device. As shown in FIG. 11, the network side device 1100 includes an antenna 1101, a radio frequency apparatus 1102, and a baseband apparatus 1103. The antenna 1101 is connected to the radio frequency apparatus 1102. In an uplink direction, the radio frequency apparatus 1102 receives information by using the antenna 1101, and transmits the received information to the baseband apparatus 1103 for processing. In a downlink direction, the baseband apparatus 1103 processes to-be-transmitted information, and transmits the information to the radio frequency apparatus 1102; and the radio frequency apparatus 1102 processes the received information and then transmits the information by using the antenna 1101.

The frequency band processing apparatus may be located in the baseband apparatus 1103. The method performed by the network side device in the foregoing embodiments may be implemented by the baseband apparatus 1103, and the baseband apparatus 1103 includes a processor 1104 and a memory 1105.

The baseband apparatus 1103 may include, for example, at least one baseband processing unit, where a plurality of chips are disposed on the baseband processing unit. As shown in the figure, one of the chips is, for example, the processor 1104, and connected to the memory 1105, to invoke the program in the memory 1105 to perform the operations of the network device shown in the foregoing method embodiment.

The baseband apparatus 1103 may further include a network interface 1106, configured to exchange information with the radio frequency apparatus 1102. The interface is, for example, a common public radio interface (CPRI).

In some embodiments, the network side device in this embodiment of the present disclosure further includes instructions or a program stored in the memory 1105 and capable of running on the processor 1104, and the processor 1104 invokes the instructions or program in the memory 1105 to perform the following operations: In an implementation, before the receiving first information for random access, the method further includes: transmitting random access-related signaling used for indicating the plurality of target signals.

In an implementation, the receiving first information used for random access includes: in a case that a plurality of uplink carriers are configured for the terminal device and target measurement values corresponding to the plurality of target signals meet a first condition, receiving the first information by using a target carrier in the plurality of uplink carriers.

In an implementation, the in a case that a plurality of uplink carriers are configured for the terminal device and target measurement values corresponding to the plurality of target signals meet a first condition, receiving the first information by using a target carrier in the plurality of uplink carriers includes: in a case that the target measurement values corresponding to the plurality of target signals are greater than a fourth threshold, receiving the first information by using a first carrier in the plurality of uplink carriers; or in a case that a target measurement value corresponding to at least one of the plurality of target signals is not greater than the fourth threshold, receiving the first information by using a second carrier in the plurality of uplink carriers, where a frequency of the first carrier is higher than that of the second carrier.

In an implementation, a transmitting manner of transmitting the second information includes one of the following manners: transmitting a plurality of pieces of second information based on a plurality of quasi-co-location-related parameters corresponding to the plurality of target signals; transmitting the second information based on at least one first quasi-co-location-related parameter corresponding to the plurality of target signals; or transmitting the second information based on a second quasi-co-location-related parameter, where the second quasi-co-location-related parameter is different from the plurality of quasi-co-location-related parameters corresponding to the plurality of target signals.

In an implementation, in a case that the number of APs associated with the plurality of target signals is greater than or equal to 2, a second time interval between a time at which the terminal device transmits the first information and a time at which the terminal device receives the second information is greater than or equal to a first time interval, where the first time interval is a time interval between a time at which the terminal device transmits the first information and a time at which the terminal device receives the second information in a case that the number of APs associated with the plurality of target signals is 1.

In an implementation, the second information includes first parameter information, and the first parameter information is different from the information of the target signal.

In an implementation, the first parameter information includes at least one of an AP, a TRP, a beam, quasi-co-location, or a transmission configuration indicator (TCI).

In an implementation, before the fourth information is transmitted to the terminal device, quasi-co-location information for transmitting the fourth information is determined based on the target second information.

In an implementation, the first information is an MSG1 in a four-step random access procedure, the second information is an MSG2 in the four-step random access procedure, the third information is an MSG3 in the four-step random access procedure, and the fourth information is an MSG4 in the four-step random access procedure.

Specific steps performed by the processor 1104 are the same as the method steps performed by the network device in FIG. 7 and FIG. 8, with the same technical effects achieved. To avoid repetition, details are not described herein again.

Figure 12:
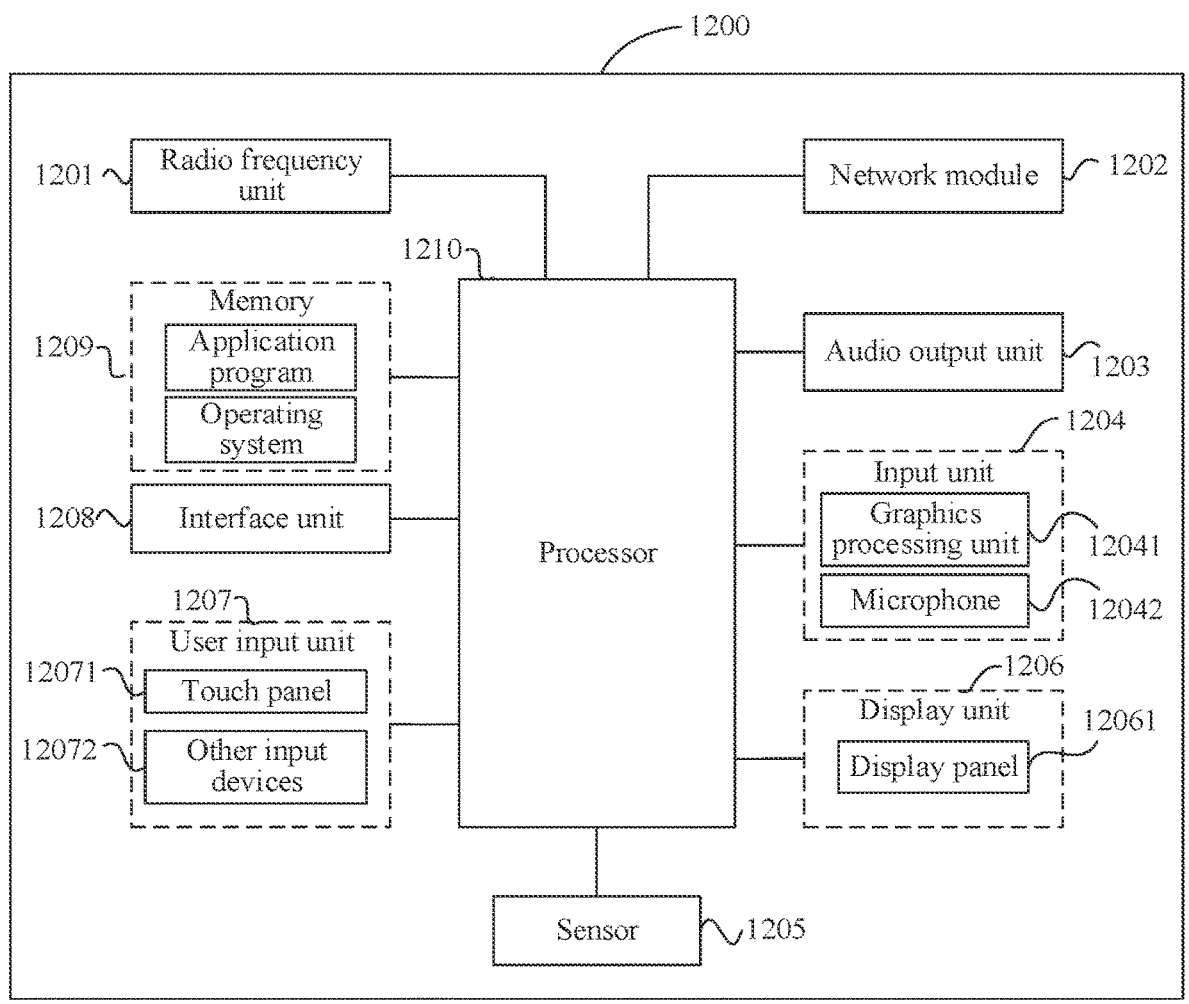
FIG. 12 is a schematic structural diagram of a terminal device according to another embodiment of the present disclosure.

FIG. 12 is a schematic diagram of a hardware structure of a terminal device for implementing an embodiment of this application.

The terminal device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

Persons skilled in the art can understand that the terminal device 1200 may further include a power supply (for example, a battery) that supplies power to each component. The power supply may be logically connected to the processor 1210 by using a power management system, to implement functions such as charging management, discharging management, and power consumption management by using the power management system. The terminal device structure shown in the figure does not constitute a limitation on the terminal device. The terminal device may include more or fewer components than those shown in the figure, or some components may be combined, or there may be a different component layout. Details are not described herein again.

It should be understood that, in this embodiment of this application, the input unit 1204 may include a graphics processing unit (GPU) 12041 and a microphone 12042. The graphics processing unit 12041 processes image data of a static picture or a video that is obtained by an image capture apparatus (for example, a camera) in a video capture mode or an image capture mode. The display unit 1206 may include the display panel 12061. The display panel 12061 may be configured in a form of a liquid crystal display, an organic light-emitting diode, or the like. The user input unit 1207 includes a touch panel 12071 and other input devices 12072. The touch panel 12071 is also referred to as a touchscreen. The touch panel 12071 may include two parts: a touch detection apparatus and a touch controller. The other input devices 12072 may include but are not limited to a physical keyboard, a function key (such as a volume control key or an on/off key), a trackball, a mouse, and a joystick. Details are not described herein.

In this embodiment of this application, the radio frequency unit 1201 receives downlink data from a network side device and then transmits the downlink data to the processor 1210 for processing; and transmits uplink data to the network side device. Usually, the radio frequency unit 1201 includes but is not limited to an antenna, at least one amplifier, a transceiver, a coupler, a low noise amplifier, a duplexer, and the like.

The memory 1209 may be configured to store software programs or instructions and various data. The memory 1209 may mainly include a program or instruction storage region and a data storage region. The program or instruction storage region may store an operating system, an application program or instructions required by at least one function (for example, an audio play function or an image play function), and the like. In addition, the memory 1209 may include a high-speed random access memory, or may include a non-volatile memory, where the non-volatile memory may be a Read-Only Memory (ROM), a Programmable ROM (PROM), an Erasable PROM (EPROM), an Electrically EPROM (EEPROM), or a flash memory, for example, at least one magnetic disk storage device, a flash memory, or another non-volatile solid-state storage device.

The processor 1210 may include one or more processing units. In some embodiments, the processor 1210 may integrate an application processor and a modem processor. The application processor mainly processes an operating system, a user interface, an application program or instructions, and the like. The modem processor mainly processes wireless communication, for example, a baseband processor. It may be understood that the modem processor may not be integrated in the processor 1210.

The processor 1210 is configured to: transmit first information used for random access, where a preamble carried in the first information is determined based on information of a plurality of target signals; receive second information transmitted by a network device, where the second information is a random access response to the first information; transmit third information based on the second information; and receive fourth information transmitted by the network device, where the fourth information is response information to the third information.

In an implementation, the information of the plurality of target signals varies, and the information of the target signal is at least one of the following: an index of the target signal, a synchronization raster sync raster, a frequency domain resource, a time domain resource, a sequence format, a quasi-co-location-related parameter, a beam, a transmission configuration indicator TCI, or an associated transmitting receiving point (TRP) and access point (AP).

In an implementation, before the first information used for random access is transmitted, a downlink signal is measured; and the plurality of target signals are determined based on a measurement result of the downlink signal, where target measurement values corresponding to the plurality of target signals meet at least one of the following preset conditions: the target measurement values corresponding to the plurality of target signals are greater than or equal to a first threshold; or a difference between a plurality of target measurement values corresponding to the plurality of target signals is less than or equal to a second threshold, where the target measurement values are at least one of a reference signal received power (RSRP), a signal-to-noise and interference ratio (SINR), or reference signal received quality (RSRQ).

In an implementation, the first threshold and/or the second threshold are configured by a network device for the terminal device.

In an implementation, the plurality of target signals are indicated by a network device by using random access-related signaling.

In an implementation, the random access-related signaling carries at least one of the following information:
an index of the preamble, a physical random access channel (PRACH) mask index, or information about a carrier for transmitting the first information.

In an implementation, there is an association relationship between the information of the target signal and the parameter of the preamble, where the parameter of the preamble includes at least one of an index of the preamble, a frequency domain resource of the preamble, or a time domain resource of the preamble.

In an implementation, there is an association relationship between the index of the preamble and a preamble sequence format, and the preamble sequence format includes at least one of a sequence length, a subcarrier spacing (SCS), or a root sequence.

In an implementation, the information of the plurality of target signals includes a difference between a plurality of target measurement values corresponding to the plurality of target signals.

In an implementation, the association relationship between the information of the target signal and the parameter of the preamble is a one-to-one correspondence.

In an implementation, before the transmitting first information used for random access, the method further includes: determining, based on the association relationship between the information of the target signal and the parameter of the preamble, parameters of the preamble that correspond to the information of the plurality of target signals.

In an implementation, the determining, based on the association relationship between the information of the target signal and the parameter of the preamble, parameters of the preamble that correspond to the information of the plurality of target signals includes: determining random access occasions ROs associated with the plurality of target signals; and determining a first target preamble from a plurality of preambles corresponding to the ROs associated with the plurality of target signals.

In an implementation, the determining, based on the association relationship between the information of the target signal and the parameter of the preamble, parameters of the preamble that correspond to the information of the plurality of target signals includes: determining ROs associated with the plurality of target signals; selecting one RO from the ROs associated with the plurality of target signals, where a preamble corresponding to the selected RO is used as a preamble candidate set, and determining a second target preamble from the preamble candidate set.

In an implementation, the transmitting first information used for random access includes: in a case that a plurality of uplink carriers are configured for the terminal device and target measurement values corresponding to the plurality of target signals meet a first condition, transmitting the first information by using a target carrier in the plurality of uplink carriers.

In an implementation, the in a case that a plurality of uplink carriers are configured for the terminal device and target measurement values corresponding to the plurality of target signals meet a first condition, transmitting the first information by using a target carrier in the plurality of uplink carriers includes: in a case that the target measurement values corresponding to the plurality of target signals are greater than a fourth threshold, transmitting the first information by using a first carrier in the plurality of uplink carriers; or in a case that a target measurement value corresponding to at least one of the plurality of target signals is not greater than the fourth threshold, transmitting the first information by using a second carrier in the plurality of uplink carriers, where a frequency of the first carrier is higher than that of the second carrier.

In an implementation, before the transmitting first information used for random access, the method further includes: determining a random access radio network temporary identifier RNTI based on the target carrier.

In an implementation, before the transmitting first information used for random access, the method further includes: determining a transmit power for the first information for random access based on path loss values of the plurality of target signals, where each target signal corresponds to a respective path loss value.

In an implementation, the transmitting first information used for random access includes: transmitting the first information to a plurality of associated TRPs or APs through a plurality of beams respectively, where the plurality of beams correspond to one or more panels of the terminal device.

In an implementation, the receiving second information transmitted by a network device includes one of the following manners: receiving a plurality of pieces of second information based on a plurality of quasi-co-location-related parameters corresponding to the plurality of target signals; receiving the second information based on at least one first quasi-co-location-related parameter corresponding to the plurality of target signals; or receiving the second information based on a second quasi-co-location-related parameter, where the second quasi-co-location-related parameter is different from the plurality of quasi-co-location-related parameters corresponding to the plurality of target signals.

In an implementation, the second information carries frequency domain location information corresponding to the fourth information.

In an implementation, in a case that the number of APs associated with the plurality of target signals is greater than or equal to 2, a second time interval between a time at which the terminal device transmits the first information and a time at which the terminal device receives the second information is greater than or equal to a first time interval, where the first time interval is a time interval between a time at which the terminal device transmits the first information and a time at which the terminal device receives the second information in a case that the number of APs associated with the plurality of target signals is 1.

In an implementation, the second information includes first parameter information, and the first parameter information is different from the information of the target signal.

In an implementation, the first parameter information includes at least one of an AP, a TRP, a beam, quasi-co-location, and a transmission configuration indicator TCI.

In an implementation, the first information is retransmitted in a case that the terminal device does not receive the second information or the received second information does not carry a preamble index.

In an implementation, a transmit power is increased based on the number of retransmissions in a case that the first information is retransmitted.

In an implementation, a transmission format of the first information remains unchanged in a case that the first information is retransmitted.

In an implementation, after the receiving second information transmitted by a network device, the method further includes: determining one piece of target second information from a plurality of pieces of second information; and responding to the target second information to transmit the third information.

In an implementation, after the transmitting third information, the method further includes: determining, based on the target second information, quasi-co-location information for receiving the fourth information.

In an implementation, the first information is an MSG1 in a four-step random access procedure, the second information is an MSG2 in the four-step random access procedure, the third information is an MSG3 in the four-step random access procedure, and the fourth information is an MSG4 in the four-step random access procedure.

For the terminal device 1200 according to this embodiment of the present disclosure, refer to the corresponding processes performed by the terminal device in the methods 200 to 700 in the embodiments of the present disclosure. In addition, the units/modules in the terminal device 1200 and the foregoing other operations and/or functions are respectively intended to implement the processes performed by the terminal device in the methods 200 to 700, with the same or equivalent technical effects achieved. For brevity, details are not described herein again.

An embodiment of this application further provides a readable storage medium. The readable storage medium stores a program or instructions. When the program or instructions are executed by a processor, the processes of the foregoing random access method embodiments are implemented, with the same technical effects achieved. To avoid repetition, details are not described herein again.

The processor is a processor in the electronic device in the foregoing embodiments. The readable storage medium includes a computer-readable storage medium, for example, a computer Read-Only Memory (ROM), a Random Access Memory (RAM), a magnetic disk, or an optical disc.

An embodiment of this application further provides a chip. The chip includes a processor and a communications interface. The communications interface is coupled to the processor. The processor is configured to run a program or instructions, to implement the processes of the foregoing random access method embodiments, with the same technical effects achieved. To avoid repetition, details are not described herein again.

It should be understood that the chip provided in this embodiment of this application may also be referred to as a system-level chip, a system on chip, a chip system, a system-on-a-chip, or the like.

An embodiment of this application further provides a computer program product. The computer program product includes a processor, a memory, and a program or instructions stored in the memory and capable of running on the processor. When the program or instructions are executed by the processor, the steps of the method according to the first aspect are implemented.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing description of the implementations, persons skilled in the art may clearly understand that the methods in the foregoing embodiments may be implemented by using software in combination with a necessary common hardware platform, and may be implemented by using hardware. Based on such an understanding, the technical solutions of this application essentially or the part contributing to the prior art may be implemented in a form of a software product. The computer software product may be stored in a storage medium (for example, a ROM/RAM, a magnetic disk, or a compact disc), and includes several instructions for instructing a terminal (which may be a mobile phone, a computer, a server, a network device, or the like) to perform the method described in each embodiment of this application.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A random access method, performed by a terminal device, comprising:
    determining a plurality of target signals based on a measurement result of a downlink signal, wherein target measurement values corresponding to the plurality of target signals meet at least one of the following preset conditions;
        the target measurement values corresponding to the plurality of target signals are greater than or equal to a first threshold: or
        a difference between a plurality of target measurement values corresponding to the plurality of target signals is less than or equal to a second threshold,
        wherein the target measurement values are at least one of a reference signal received power (RSRP), a signal-to-noise and interference ratio (SINR), or reference signal received quality (RSRQ);
    transmitting first information used for random access, wherein a preamble carried in the first information is determined based on information of the plurality of target signals;
    receiving second information transmitted by a network device, wherein the second information is a random access response to the first information;
    transmitting third information based on the second information; and
    receiving fourth information transmitted by the network device, wherein the fourth information is response information to the third information.

2. The random access method according to claim 1, wherein the information of the plurality of target signals varies, and the information of the target signal is at least one of the following:
    an index of the target signal, a synchronization raster sync raster, a frequency domain resource, a time domain resource, a sequence format, a quasi-co-location-related parameter, a beam, a transmission configuration indicator (TCI), or an associated transmitting receiving point (TRP) and access point (AP).

3. The random access method according to claim 1, wherein
    the first threshold or the second threshold are configured by the network device for the terminal device.

4. The random access method according to claim 1, wherein the plurality of target signals are indicated by the network device by using random access-related signaling,
    wherein the random access-related signaling carries at least one of the following information:
    an index of the preamble, a physical random access channel (PRACH) mask index, or information about a carrier for transmitting the first information.

5. The random access method according to claim 1, wherein the information of the target signal is associated with a parameter of the preamble, and the parameter of the preamble comprises at least one of the index of the preamble, a frequency domain resource of the preamble, or a time domain resource of the preamble, wherein:
    the index of the preamble is associated with a preamble sequence format, and the preamble sequence format comprises at least one of a sequence length, a subcarrier spacing (SCS), or a root sequence; or
    the information of the plurality of target signals comprises a difference between a plurality of target measurement values corresponding to the plurality of target signals, and the target signal and the parameter of the preamble is in one-to-one correspondence.

6. The random access method according to claim 1, wherein transmitting the first information used for random access comprises:
    in response to a plurality of uplink carriers being configured for the terminal device and target measurement values corresponding to the plurality of target signals meeting a first condition, transmitting the first information by using a target carrier in the plurality of uplink carriers.

7. The random access method according to claim 1, wherein before transmitting the first information used for random access, the method further comprises:
    determining a transmit power for the first information for random access based on path loss values of the plurality of target signals,
    wherein each target signal corresponds to a respective path loss value.

8. The random access method according to claim 1, wherein transmitting the first information used for random access comprises:
transmitting the first information to a plurality of associated TRPs or APs through a plurality of beams respectively, wherein the plurality of beams correspond to one or more panels of the terminal device.

9. The random access method according to claim 1, wherein receiving the second information transmitted by the network device comprises one of the following:
receiving a plurality of pieces of second information based on a plurality of quasi-co-location-related parameters corresponding to the plurality of target signals;
receiving the second information based on at least one first quasi-co-location-related parameter corresponding to the plurality of target signals; or
receiving the second information based on a second quasi-co-location-related parameter, wherein the second quasi-co-location-related parameter is different from the plurality of quasi-co-location-related parameters corresponding to the plurality of target signals.

10. The random access method according to claim 1, wherein the second information carries frequency domain location information corresponding to the fourth information.

11. The random access method according to claim 9, wherein when the number of APs associated with the plurality of target signals is greater than or equal to 2, a second time interval between a time at which the terminal device transmits the first information and a time at which the terminal device receives the second information is greater than or equal to a first time interval, wherein the first time interval is a time interval between a time at which the terminal device transmits the first information and a time at which the terminal device receives the second information when the number of APs associated with the plurality of target signals is 1.

12. The random access method according to claim 1, further comprising:
retransmitting the first information when the terminal device does not receive the second information or the received second information does not carry a preamble index;
and wherein a transmit power is increased based on the number of retransmissions when the first information is retransmitted; and
a transmission format of the first information remains unchanged.

13. The random access method according to claim 1, wherein after receiving the second information transmitted by the network device, the method further comprises:
determining one piece of target second information from a plurality of pieces of second information; and
responding to the target second information to transmit the third information,
wherein after transmitting the third information, the method further comprises:
determining, based on the target second information, quasi-co-location information for receiving the fourth information.

14. A random access method, performed by a network device, comprising:
receiving first information that is used for random access and that is transmitted by a terminal device, wherein a preamble carried in the first information is determined based on information of a plurality of target signals;
transmitting second information to the terminal device, wherein the second information is a random access response to the first information;
receiving third information transmitted by the terminal device, wherein the third information is a response to one piece of target second information in the second information; and
transmitting fourth information to the terminal device, wherein the fourth information is response information to the third information
wherein transmitting the second information comprises one of the following:
transmitting a plurality of pieces of second information based on a plurality of quasi-co-location-related parameters corresponding to the plurality of target signals;
transmitting the second information based on at least one first quasi-co-location-related parameter corresponding to the plurality of target signals; or
transmitting the second information based on a second quasi-co-location-related parameter, wherein the second quasi-co-location-related parameter is different from the plurality of quasi-co-location-related parameters corresponding to the plurality of target signals.

15. The random access method according to claim 14, wherein before receiving the first information used for random access, the method further comprises:
transmitting random access-related signaling used for indicating the plurality of target signals.

16. The random access method according to claim 14, wherein receiving the first information used for random access comprises:
in response to a plurality of uplink carriers being configured for the terminal device and target measurement values corresponding to the plurality of target signals meeting a first condition, receiving the first information by using a target carrier in the plurality of uplink carriers,
wherein receiving the first information by using the target carrier in the plurality of uplink carriers comprises:
in response to the target measurement values corresponding to the plurality of target signals being greater than a fourth threshold, receiving the first information by using a first carrier in the plurality of uplink carriers; or
in response to a target measurement value corresponding to at least one of the plurality of target signals being not greater than the fourth threshold, receiving the first information by using a second carrier in the plurality of uplink carriers, wherein a frequency of the first carrier is higher than that of the second carrier.

17. The random access method according to claim 14, wherein the second information comprises first parameter information, and the first parameter information is different from the information of the target signal,
wherein the first parameter information comprises at least one of an AP, a TRP, a beam, quasi-co-location, or a transmission configuration indicator (TCI).

18. The random access method according to claim 14, wherein before transmitting the fourth information to the terminal device, the method further comprises:
determining, based on the target second information, quasi-co-location information for transmitting the fourth information.

19. A terminal device, comprising:
a non-transitory memory storing a computer program; and a processor coupled to the non-transitory memory and configured to execute the computer program to perform operations comprising:

determining a plurality of target signals based on a measurement result of a downlink signal, wherein target measurement values corresponding to the plurality of target signals meet at least one of the following preset conditions;

the target measurement values corresponding to the plurality of target signals are greater than or equal to a first threshold; or a difference between a plurality of target measurement values corresponding to the plurality of target signals is less than or equal to a second threshold, wherein the target measurement values are at least one of a reference signal received power (RSRP), a signal-to-noise and interference ratio (SINR), or reference signal received quality (RSRO);

transmitting first information used for random access, wherein a preamble carried in the first information is determined based on information of the plurality of target signals;

receiving second information transmitted by a network device, wherein the second information is a random access response to the first information;

transmitting third information based on the second information; and receiving fourth information transmitted by the network device, wherein the fourth information is response information to the third information.

* * * * *